(12) United States Patent
Malvisalo et al.

(10) Patent No.: US 9,056,730 B2
(45) Date of Patent: Jun. 16, 2015

(54) LOADING AND UNLOADING STATION

(75) Inventors: Jani M Malvisalo, Tampere (FI); Tero T Vartiainen, Lakiala (FI)

(73) Assignee: FASTEMS OY AB, Tampere (FI)

( * ) Notice: Subject to any disclaimer, the term of this patent is extended or adjusted under 35 U.S.C. 154(b) by 1134 days.

(21) Appl. No.: 13/022,849

(22) Filed: Feb. 8, 2011

(65) Prior Publication Data

US 2011/0192871 A1 Aug. 11, 2011

(30) Foreign Application Priority Data

Feb. 8, 2010 (FI) ...................................... 20105122

(51) Int. Cl.
| | | |
|---|---|---|
| *H01L 51/56* | (2006.01) | |
| *B65G 65/00* | (2006.01) | |
| *B66F 7/06* | (2006.01) | |

(52) U.S. Cl.
CPC ...... *B65G 65/00* (2013.01); *B65H 2301/42254* (2013.01); *B65H 2301/42256* (2013.01); *B66F 7/0633* (2013.01)

(58) Field of Classification Search
USPC .................... 28/281.1, 281.2, 281.3, 281.5
See application file for complete search history.

(56) References Cited

U.S. PATENT DOCUMENTS

| | | | | |
|---|---|---|---|---|
| 3,426,922 | A | | 2/1969 | Massey |
| 3,958,793 | A | * | 5/1976 | Garate .......................... 254/10 B |
| 5,207,333 | A | * | 5/1993 | Peng ............................ 211/85.8 |
| 5,599,154 | A | | 2/1997 | Hölscher et al. |
| 8,567,763 | B1 | * | 10/2013 | Nolan ........................... 254/122 |
| 8,770,549 | B2 | * | 7/2014 | Deuring et al. ................ 254/122 |
| 2003/0178610 | A1 | | 9/2003 | Finkbeiner |
| 2004/0061100 | A1 | | 4/2004 | Keaton et al. |
| 2005/0045427 | A1 | * | 3/2005 | Rennetaud et al. ........... 187/269 |

FOREIGN PATENT DOCUMENTS

| | | |
|---|---|---|
| BE | 366902 | 2/1930 |
| DE | 2063 304 | 7/1972 |
| EP | 0 111 848 A1 | 6/1984 |
| EP | 0 170 221 A1 | 2/1986 |
| EP | 0 534 540 A2 | 3/1993 |

(Continued)

OTHER PUBLICATIONS

Extended European Search Report issued in European Application No. 11397502.3 on Jun. 8, 2011.

(Continued)

*Primary Examiner* — Lee D Wilson
(74) *Attorney, Agent, or Firm* — Oliff PLC

(57) ABSTRACT

A loading and unloading station, comprising: a frame, on top of which a cassette intended for the carrying and storage of loads can be placed; at least two supporting arms connected to the frame in a pivotable manner so that the supporting arms can pivot around substantially horizontal pivot axes to a substantially horizontal position, in which the supporting arms are placed under the cassette, and to a substantially vertical position, in which the supporting arms extend through the cassette; at least one supporting beam, on top of which the load can be placed and to which the at least two supporting arms are connected in a movable manner; and the supporting arms are fitted both to lift the supporting beam from below the cassette through the cassette above the cassette, and to lower the supporting beam back under the cassette; and the supporting arms are further fitted to keep the supporting beam substantially horizontal.

14 Claims, 9 Drawing Sheets

(56) References Cited

FOREIGN PATENT DOCUMENTS

| | | | |
|---|---|---|---|
| EP | 1 582 481 | A1 | 10/2005 |
| FR | 2 730 483 | A1 | 8/1996 |
| WO | WO 01/27002 | A1 | 4/2001 |
| WO | WO 2009/067762 | A1 | 6/2009 |

OTHER PUBLICATIONS

Finnish Office Action issued in Finnish Patent Application No. 20105122 on Sep. 1, 2010 (with translation).
Finnish Search Report issued in Finnish Patent Application No. 20105122 on Sep. 1, 2010 (with translation).

* cited by examiner

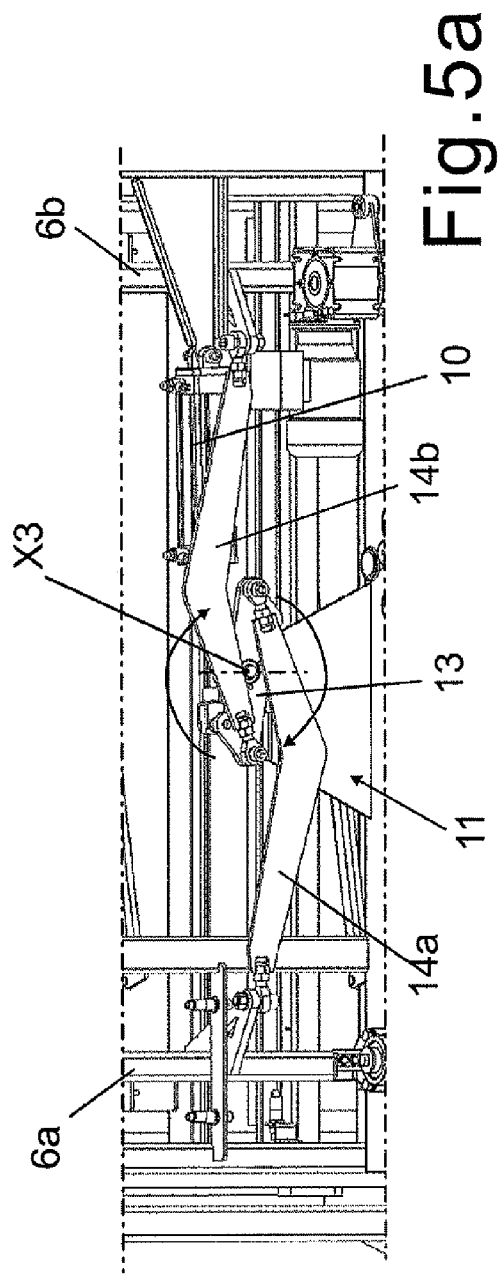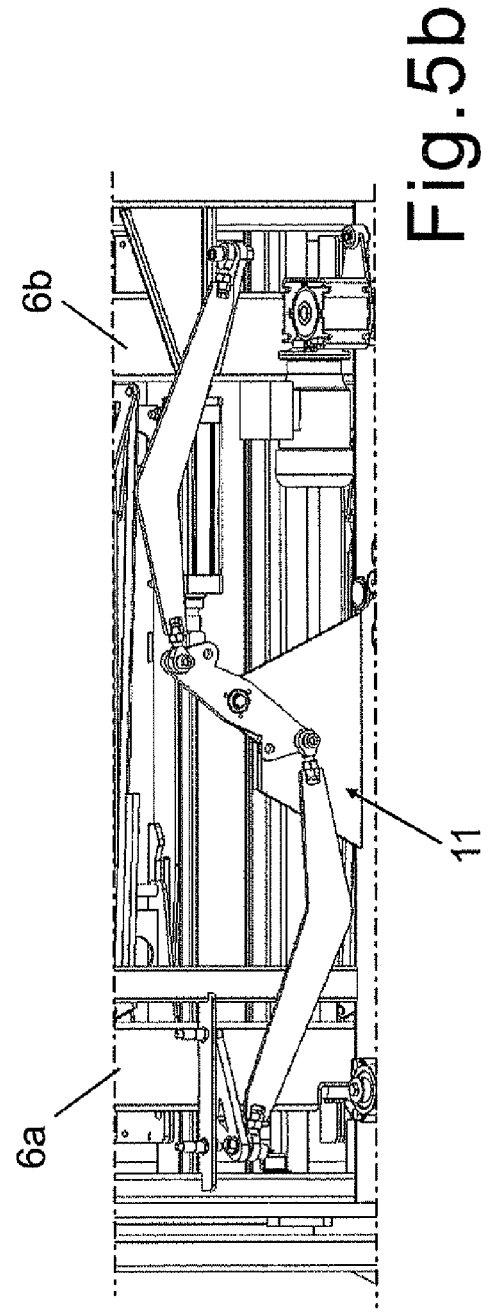

LOADING AND UNLOADING STATION

FIELD OF THE INVENTION

The invention relates to a loading and unloading station. The loading and unloading station is used in the manipulation of loads, such as sheets, sheet material or pallets, when loads are transferred into a cassette for storage, or away from it.

BACKGROUND OF THE INVENTION

Sheets are often manipulated by means of cassettes, in which cassettes one or several sheets are held in the horizontal position and on top of each other. By means of the cassettes, the sheets are held in a storage, which is, for example, a high rise storage or a shelf system, in which the cassettes are placed. A cassette is presented in publication EP 1582481 A1. The cassettes are fed into the storage and delivered from the storage by using a separate station, by means of which the sheets can be delivered to the cassette or removed from the cassette, for example by means of the fork of a forklift. The station comprises a kind of a table which is fixed to be stationary or, in the normal case, is movable by means of rails back and forth into and out of the storage. The storage is also provided with the necessary lifting and transfer devices, by means of which the cassette can be transferred to a desired location, or onto the table.

A rectangular station of prior art comprises bars which, when lifted up, elevate the sheets up from the cassette. In a corresponding manner, the sheets can be lowered onto the bars, for example by means of the fork of a forklift, and when lowered down, the bars lower the sheets into the cassette. For this purpose, the bottom of the cassette is provided with openings, through which the bars can ascend higher than the cassette and descend lower than the cassette. The bars are pivoted around a horizontal pivot axis from a horizontal position to a vertical position.

In the above-mentioned examples, the pivot axis of the bars is transverse to the longitudinal direction of the station. The station comprises several pivotable beams, to which the bars are fastened and which are parallel to said pivot axis. The bars which pivot in opposite directions are placed horizontally in an interlaced fashion.

In a station of prior art, the bars are continuously vertical, and a horizontal supporting beam can be placed temporarily at the end of two or more bars. The supporting beams are capable of supporting sheets and sheet materials as well as pallets, for example as many as five euro pallets, which are lowered into the cassette. The cassette is provided with openings, through which the bars and the supporting beams extend.

One problem is that the vertically moving bars require a lot of space in the height direction, in which case the station becomes unnecessarily high, wherein the use of a forklift and the fork of the forklift may be problematic, and the apparatus requires a lot of space in the height direction. The bars can be converted to be pivotable, but the elongated horizontal supporting beam cannot be fixed to the bars in a stationary manner, because the bars are interlaced, as already mentioned above. Furthermore, there is a risk that when pivoting in the lateral direction, said bars collide with the fork which is parallel to the width direction of the station.

BRIEF SUMMARY OF THE INVENTION

A solution has been developed to eliminate the above-presented problems and also to achieve other advantages. The loading and unloading station according to the invention is presented in claim 1.

In this solution, pivotable supporting arms are used, whose pivot axis, in the first example, is transverse to the width direction of the station. A beam that is parallel to said pivot axis is connected to two or more supporting arms in a stationary manner. Preferably, the station comprises several parallel supporting beams, by means of which it is possible to manipulate, in other words, to lift and lower sheets, sheet material or pallets. In the station, mechanisms are applied, which are as low as possible, to facilitate a low structure of the station in combination with pivotable supporting arms. In an example, the actuator is a cylinder that is also placed in a horizontal position.

The supporting arm for lifting the supporting beam, and the mechanism for lifting the supporting arms, are primarily placed under the supporting beam and in the space limited by the supporting beam so that the fork of a forklift has as much space as possible between the supporting beams. When pivoting, the supporting arms are turned in a direction that is parallel with both the elongated supporting beam and the fork of the forklift, wherein the supporting arms do not collide with the fork. The cassette is a separate, self-contained part with respect to the station. The cassette only needs an opening for the supporting beam, because the supporting beams are placed in their different positions under the supporting beam, so that the openings of the cassette can be kept small and the rigidity of the cassette is improved. The supporting beam can also be placed close to the end of the station and the cassette, wherein, for example, the end of the sheet and the outermost pallet are supported to a sufficient degree.

In combination with the cassette, the station also becomes low, wherein the lifting and transfer devices of the storage can be placed as low as possible, and thereby more cassettes can be placed on top of each other in the storage. The low placement of the lifting and transfer devices also entails other advantages, and their functioning with other devices is facilitated. Thanks to the low structure, the station can be placed at such a height level that a forklift with front idlers can be applied. In this case, the idlers of the forklift can roll under the station, and the fork is above the station or between the supporting beams. Furthermore, the actuators, legs or wheels of the station and other structures and actuators can be placed so that they are fitted between the idlers of the forklift, when the forklift is applied to manipulate a separate pallet to be placed at an end of the station.

DESCRIPTION OF THE DRAWINGS

In the following, the invention will be described in more detail with reference to examples and the appended drawings, in which.

DETAILED DESCRIPTION OF THE INVENTION

Figure 1:
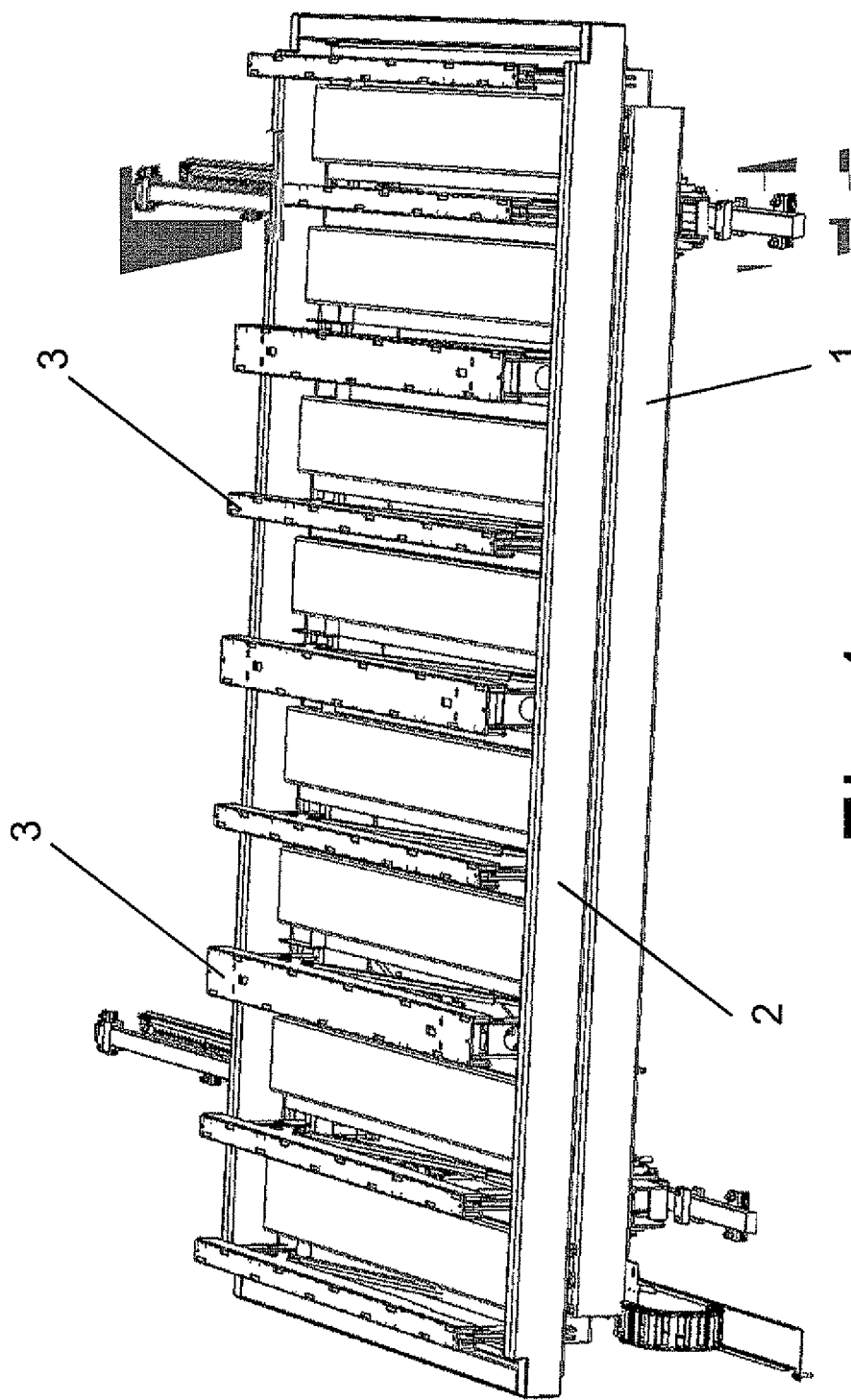
FIG. 1 shows a loading and unloading station according to an example.

In FIG. 1, a loading and unloading station, which is also called a station in this description, is shown together with a cassette 2. The station comprises a frame 1, which is normally a square or rectangular horizontal framework, provided with the necessary mechanisms and actuators. In this example, wheels or rolls are coupled under the frame 1, by means of which the station can be transferred along rails or a corresponding track. In this example, the frame 1 can be transferred in a direction parallel to the short side of the station, but alternatively, the direction of transfer may also be parallel to the long side of the station.

A separate cassette 2 can be lowered on top of the frame 1. Typically, this is performed so that a lifting and transfer device grasps under both ends of the cassette 2 and performs the desired transfers. The length of the frame 1 as well as the placement of the mechanisms and the actuators are selected so that the lifting and transfer device has sufficient space to be placed under the ends of the cassette 2, adjacent to the frame 1. Preferably, the frame 1 and the connected mechanisms and horizontal supporting beams 3, when in their lowermost position, are placed at the level of the lower surface of the cassette 2, or lower than that. Also preferably, the horizontal supporting beams 3, when in their uppermost position shown in FIG. 1, are placed at a distance upwards from the top surface of the cassette 2. Said distance allows the pushing of the fork of the forklift into the area between the top surface of the supporting beam 3 and the top surface of the cassette 2, preferably by a horizontal movement.

In this example, the cassette 2 comprises a frame which is normally a square or rectangular horizontal framework, to which the bottom is fastened. The bottom comprises openings or slits, through which the horizontal supporting beams 3 are lifted and lowered. The frame of the cassette may be provided with wheels or rolls, by means of which it rests in place or moves, for example on top of the loading and unloading station shown, or in a storage. In this specification, the cassette is a general term for any load chassis having a structure corresponding to the cassette shown in the examples and being capable of functioning as the presented cassette together with a loading and unloading station, particularly with its supporting beams and supporting arms.

Figure 2A:
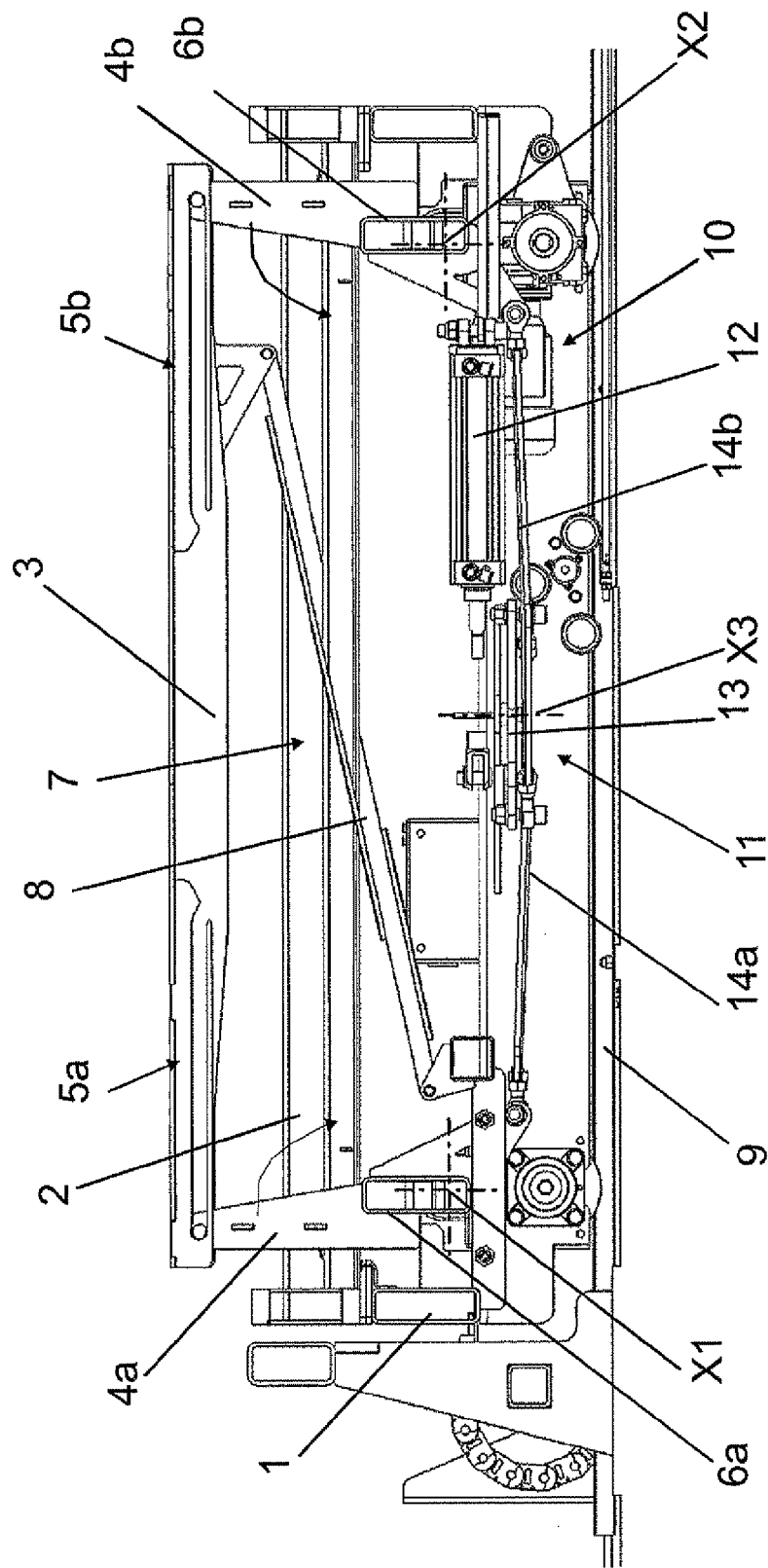
FIGS. 2a, 2b show cross-sectional views of the station of FIG. 1, seen from the end, illustrating the lifting and lowering movements of the station.

In the cross-sectional view of FIG. 2a, the elongated supporting beam 3 as well as the mechanism for lifting and lowering the supporting beam 2, are shown in their uppermost position. In the cross-sectional view of FIG. 2b, the supporting beam 3 as well as the mechanism for lifting and lowering the supporting beam 2, are shown in their lowermost position.

The supporting beam 4a is coupled to the substantially horizontal supporting beam 3 in a movable manner, for example by means of a guide 5a. In this example, the guide 5a is formed by means of a pin movable in a horizontal slot. The supporting arm 4a is fitted to pivot around a horizontal pivot axis X1.

The pivot axis X1 is substantially perpendicular to the longitudinal direction of the supporting beam 3. In this example, the station comprises at least two parallel pivoting beams 6a and 6b which are parallel to each other and with respect to the pivot axis X1. One or more arms 4a in a row are connected to the pivoting beam 6a, and they are all pivoted simultaneously by pivoting the pivoting beam 6a which is articulated to the frame 1 in such a way that the pivot axis is X1. For example, if there are several pivoting beams 6a one after the other, they have a common pivot axis X1. Normally, there are only two pivoting beams, namely the pivoting beams 6a and 6b, and for example 6 to 9 arms are connected to each of them. The structure of the pivoting beam 6b corresponds to the structure of the pivoting beam 6a, but the pivot axis, in turn, is X2 which is parallel to the pivot axis X1. The supporting arm 4b is connected to the supporting beam 3, corresponding to the structure of the supporting arm 4a, for example, by means of a guide 5b.

The supporting beam 3 is held in a substantially horizontal position during the lifting and lowering movement, when sheets, sheet material or pallets are lifted from the cassette 2 or lowered into the cassette 2. For this purpose, the supporting arms 4a, 4b are fitted to pivot in opposite directions and to operate in a synchronized manner and simultaneously. Preferably, as in the examples shown in the figure, the supporting arms 4a, 4b, when lowered, turn to point at each other, but it is also possible to arrange that the supporting arms turn to point away from each other. In their lowermost position, the supporting arms 4a, 4b are placed preferably in parallel and are not interlaced, wherein the ends of the supporting arms 4a, 4b, to which the supporting beam 3 is connected, remain at a distance from each other.

Figure 2B:
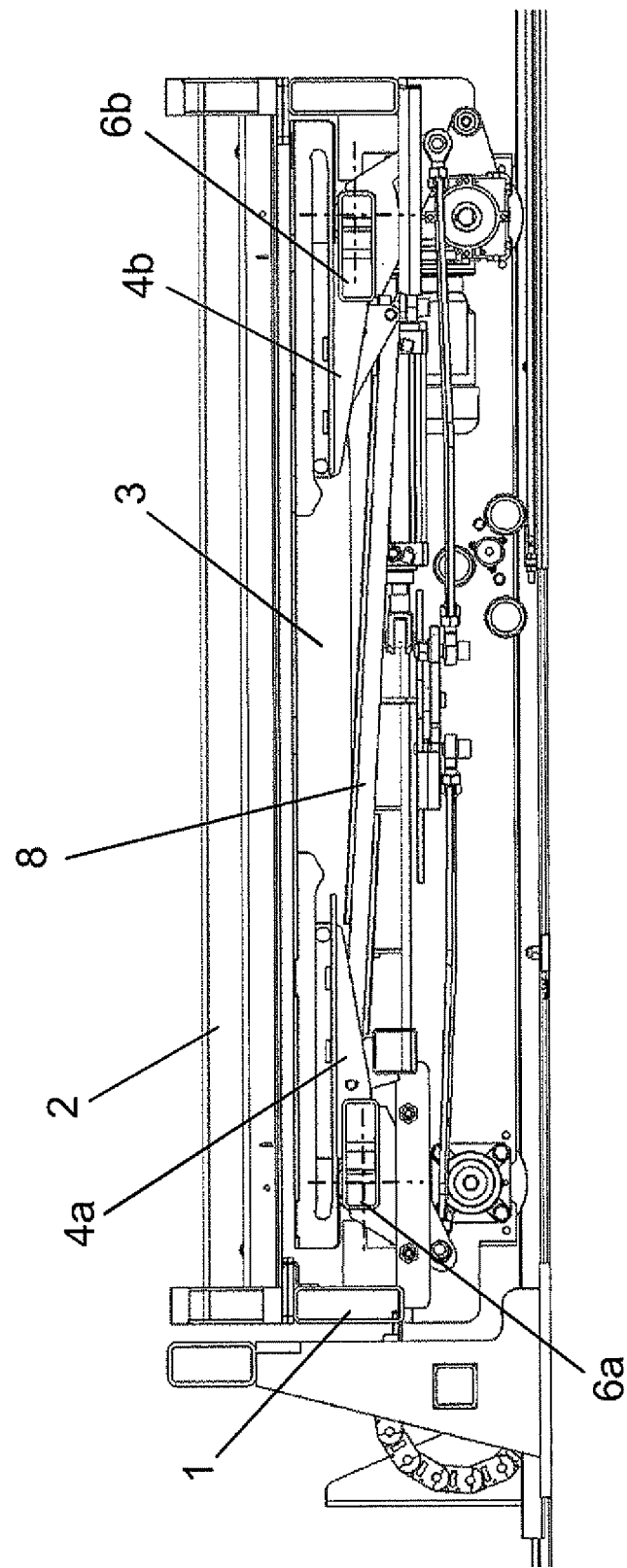

In the examples of FIGS. 2a, 2b, during the lifting and lowering movement, the guides 5a, 5b allow horizontal movements of the supporting beam 3 which must be prevented to prevent the supporting beam 3 from colliding with the cassette 2 or the frame 1. For this purpose, a stopper mechanism 7 is provided between the supporting beam 3 and the frame 1 to limit and reduce or totally prevent the horizontal movement of the supporting beam 3. In the example of FIGS. 2a, 2b, the stopper mechanism 7 comprises a stopper arm 8 which is articulated to the supporting beam 3 on one hand and to the frame 1 on the other hand. The longer the stopper arm 8 is, the shorter is the horizontal movement of the supporting beam 3. The stopper arm 8 pivots in the vertical plane which is perpendicular to the axis lines X1, X2. Preferably, the stopper mechanism 7 is placed entirely under the supporting beam 3, and its width corresponds to the width of the supporting beam 3 or is narrower than that. In a corresponding manner, preferably the supporting arms 4a, 4b are also placed entirely under the supporting beam 3.

The supporting beam 3 can be coupled to two or more supporting arms in a movable manner, but the lifting or lowering movements of the different supporting arms must still be synchronized and simultaneous. In the case of three or more supporting arms, supporting arms pivoting in the same direction may also be connected to the supporting beam.

The station shown in FIGS. 2a, 2b is configured to move along rails 9 which are, in this example, parallel to the supporting beam 3. The lower surface of the frame 1 is provided with wheels or rolls which roil along the rail 9 and whose actuator 10 normally comprises an electric motor.

FIGS. 2a, 2b show a lifting and lowering mechanism 11 for the supporting arms, coupled to the supporting arms 4a, 4b either directly or by means of the pivoting beams 6a, 6b. The lifting and lowering mechanism 11 is controlled by at least one actuator 12 which is, in this example, a horizontal cylinder. The horizontal cylinder has the advantage of a low structure. The function of the lifting and lowering mechanism 11 is to bring the supporting arms 4a, 4b in a simultaneous, synchronized movement. The force needed for lifting the supporting arms, the supporting beam 3 and the load placed on the supporting beam is, in turn, generated by the actuator 12.

The lifting and lowering mechanism 11 according to an example is shown in FIGS. 5a, 5b seen from below. The lifting and lowering mechanism 11 comprises an arm 13 pivoting around a vertical pivot axis X3 (FIGS. 2a, 2b) and having two positions which are shown in FIGS. 5a and 5b and to which it is guided by means of the actuator 12. Said positions correspond to the horizontal position and the vertical position of the supporting arms 4a, 4b. The arm 13, in turn, is coupled by joints to push arms 14a, 14b, which, in turn, are coupled by joints to the pivoting beams 6a, 6b or alternatively to the supporting arms 4a, 4b. In FIG. 5b, the pivoting arm 13 pulls the push arm 14a which, in turn, pulls the arm 4a and forces it to pivot to the vertical position shown in FIG. 5a. In FIG. 5a, the arm 13 pivoting in the opposite direction pushes the push arm 14a which, in turn, pushes the arm 4a and forces it to pivot to the horizontal position shown in FIG. 5b. The arm 4b and the push arm 14b function in a corresponding manner.

The positions of the pivot axes and the pivots of the lifting and lowering mechanism 11, particularly the positions of the joints of the pivot axis of the arm 13 and the push arms 14a, 14b, are fitted so that the external force effective on the vertical supporting arm cannot tip the supporting arm over. Instead, said force generates via the push arm 14a, 14b a moment tending to pivot the arm 13 in the direction that corresponds to lifting of the arm 4a, as shown in FIG. 5a. Consequently, the external force effective on the supporting arms 4a, 4b generates a locking force or moment in the lifting and lowering mechanism 11, to maintain the vertical position of the supporting arms 4a, 4b.

Figure 3:
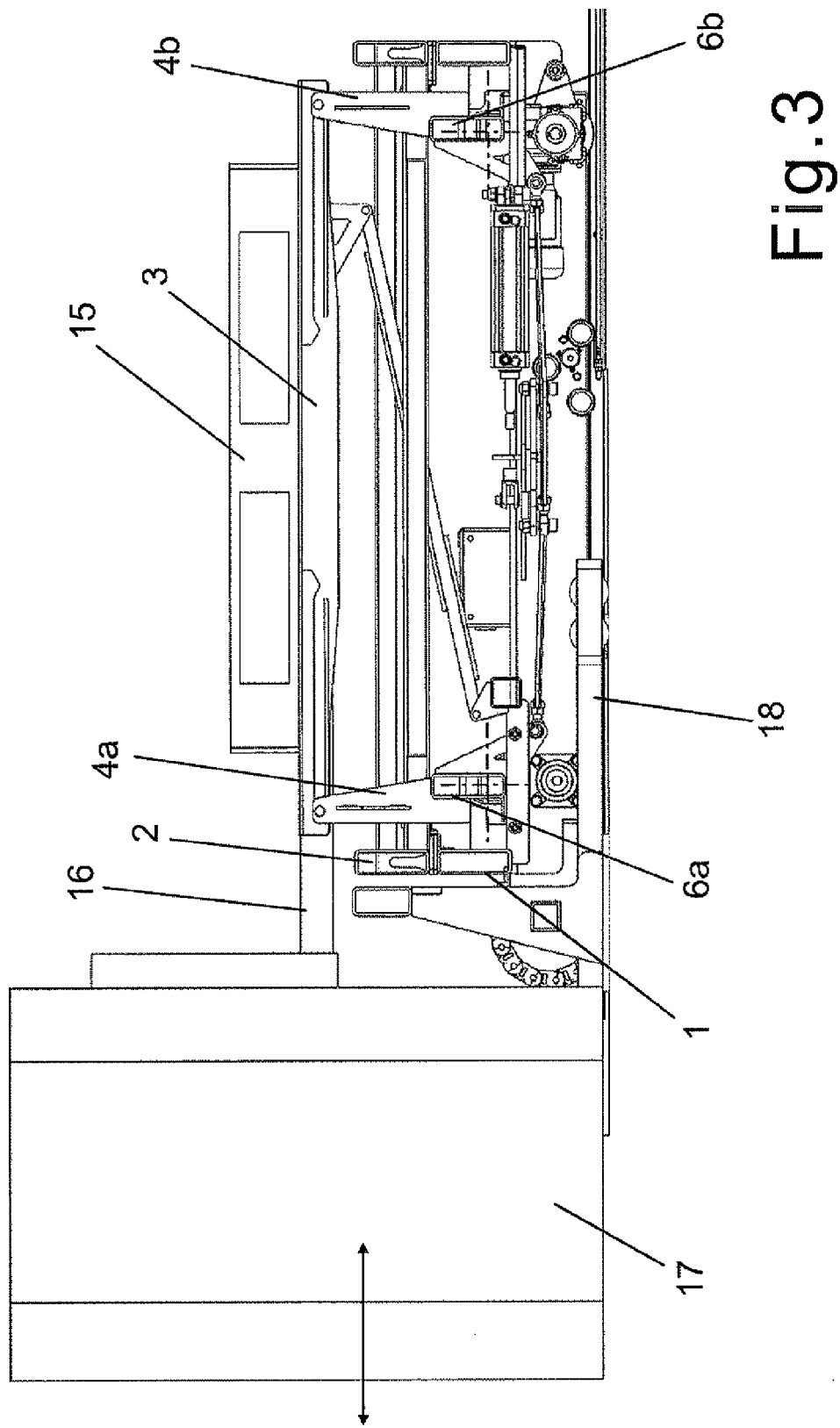
FIG. 3 shows a cross-sectional view of the station of FIG. 1, seen from the end, illustrating the functioning of the station with a forklift.
Figure 4:
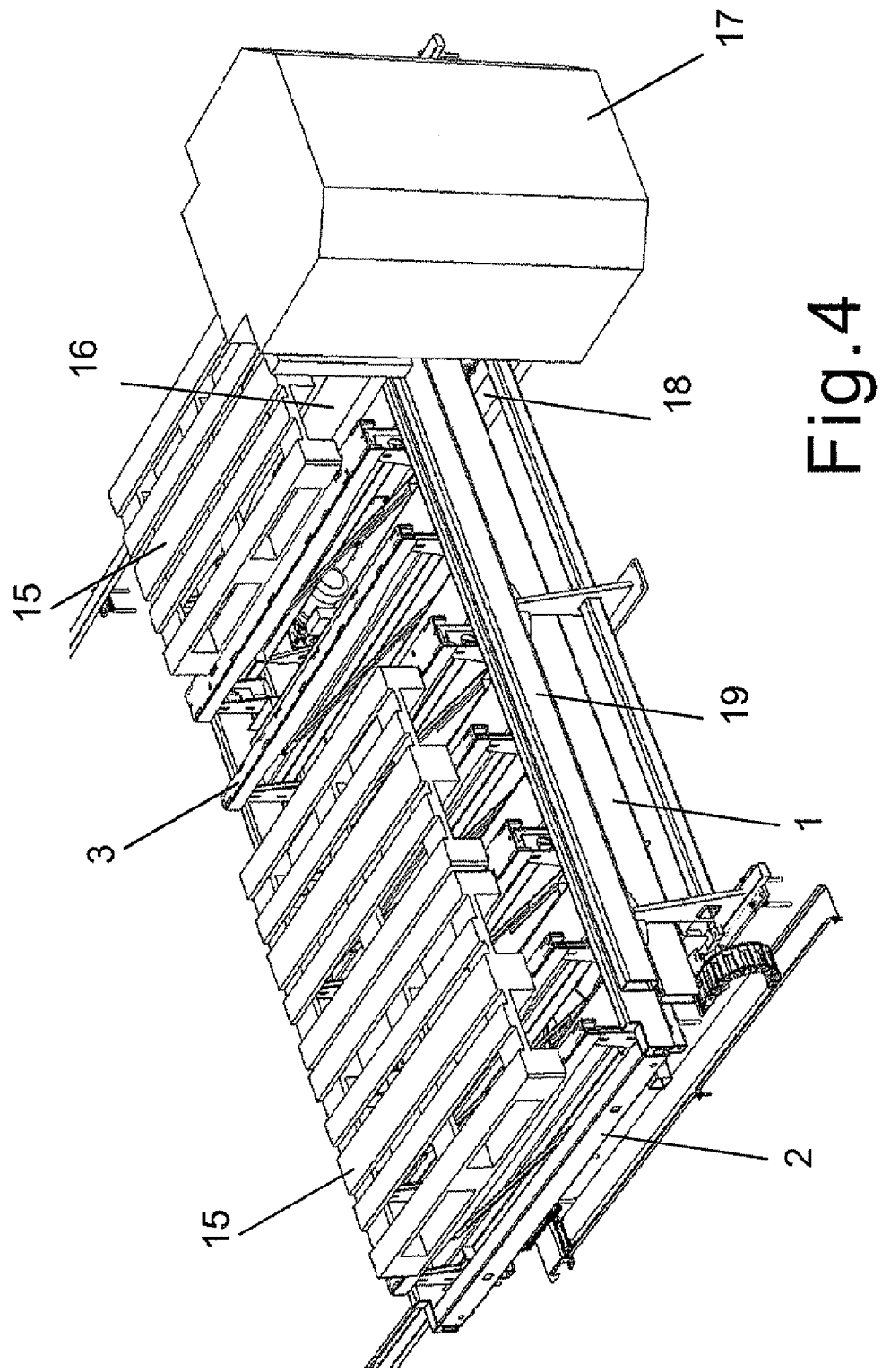
FIG. 4 shows the station of FIG. 1, FIGS. 5a, 5b show the lifting and lowering mechanism according to an example of the station, seen from below, as well as its movements.

FIGS. 3 and 4 show pallets 15 placed on the supporting beams 3 lifted up. The pallets 15 are ready to be lowered into the cassette 2, or they are to be picked up, one by one, from the station by a forklift 17 equipped with a fork 16. The fork 16 typically comprises two horizontal and parallel lifting arms spaced from each other and moving in the vertical direction. The width of at least some supporting beams 3 and the space between two supporting beams 3 is fitted to be such that the fork is placed between the supporting beams, and one supporting beam remains between the lifting arms of the fork. The lifting arms of the fork 16 are parallel to the beams 3 and simultaneously also substantially perpendicular to the pivot axes X1, X2. The width of the supporting beam 3 may also be wider in those supporting beams which support two adjacent pallets. The fork 16 has as free access as possible between the supporting beams 3, and the idlers 18 of the forklift have access below the station. The figure also shows a collision protection 19 which can be provided as a protection between the forklift 17 and the station.

In various examples, the loading and unloading station can be applied either in such a way that the load is lifted or lowered by the supporting beams, or in such a way that the load is lowered by means of the cassette or the fork onto the supporting beams which are in the elevated position, in which case the supporting beams are not used for lifting or lowering the load. When elevated, the cassette carries the load with it, or when lowered, the cassette leaves the load on the supporting beams in the elevated position. The way of function will affect, among other things, the construction.

Figure 9:
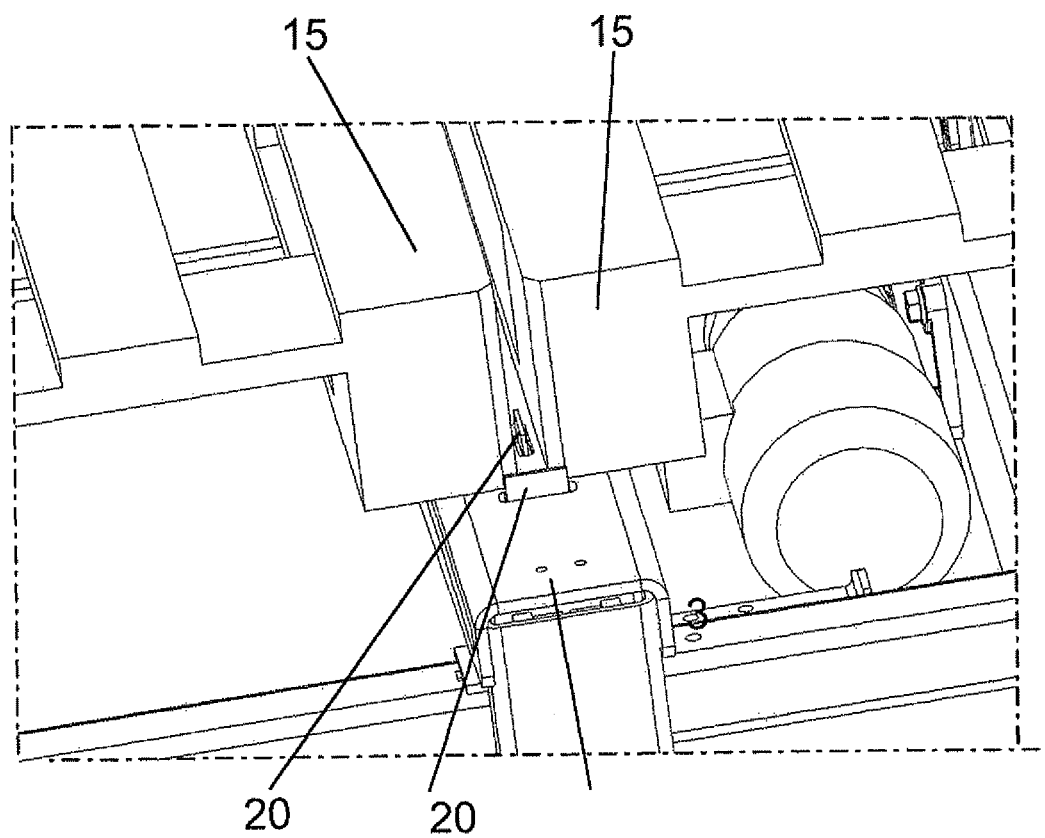
FIG. 9 shows guides for pallets, according to an example.

FIG. 9 shows a guide 20 for pallets 15, which guide can be applied in one or more supporting beams 3. The guide 20 is fastened to the supporting beam in a resilient way so that the load placed on top of the guide 20 presses it down, lower than the top surface of the supporting beam 3. If the guide is not pressed down, it will automatically ascend and extend higher than the top surface of the supporting beam 3. The supporting beam is provided with one or more guides 20 which limit the horizontal movement of the pallets and assist in the placement of the pallets. In this example, the guide 20 extends through an opening in the supporting beam. The guide 20 remains elevated, for example by means of a spring element, although it is subjected to horizontal forces.

Figure 6:
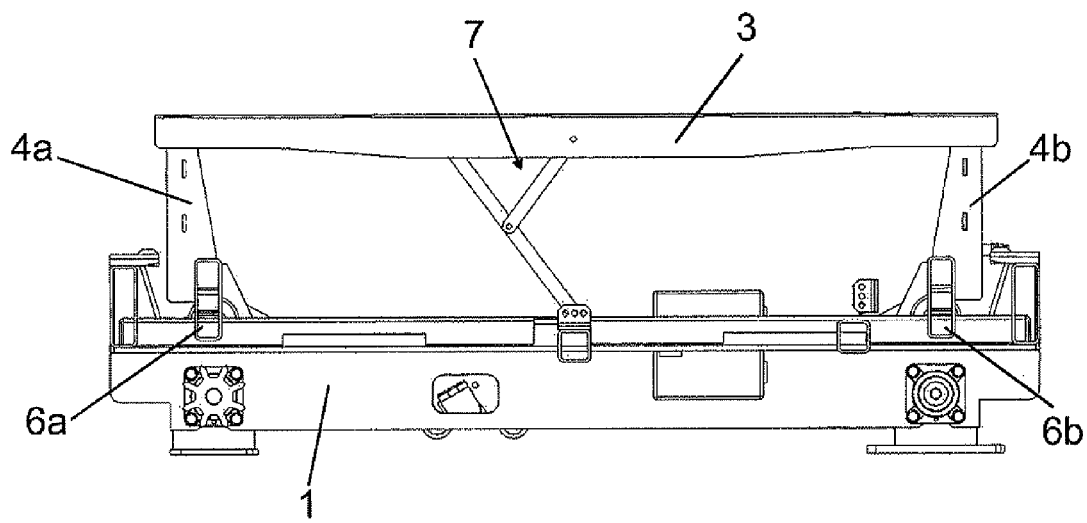
FIG. 6 shows a stopper mechanism according to an example.
Figure 7:
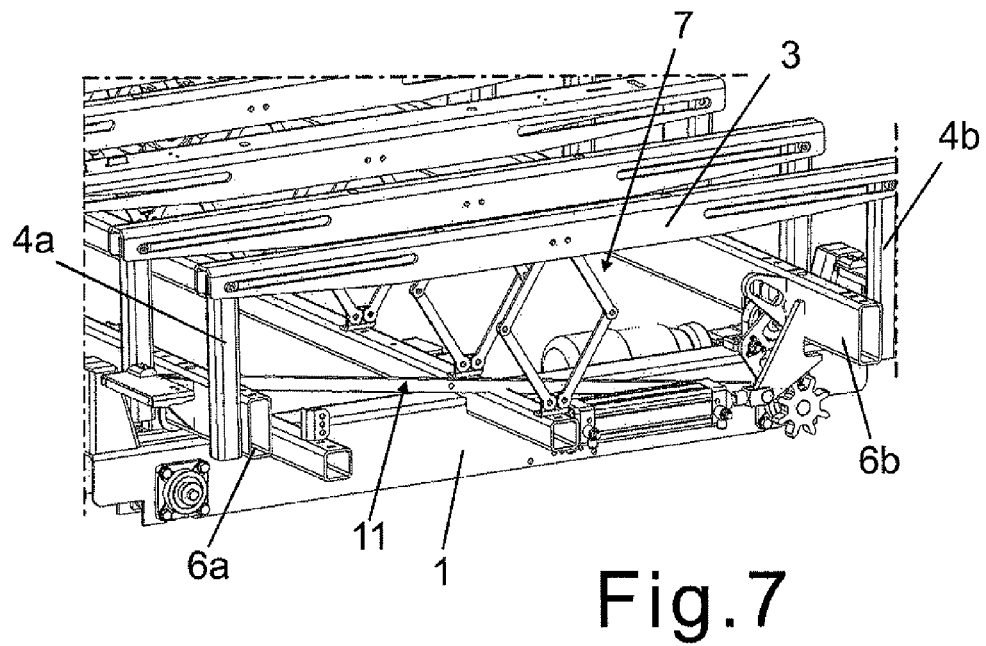
FIG. 7 shows a lifting and lowering mechanism and a stopper mechanism according to some examples.

FIG. 6 shows an alternative stopper mechanism 7 comprising a lever or a set of levers coupled between the frame 1 and the supporting beam 3, where also guides can be applied. Further, FIG. 7 shows an alternative lifting and lowering mechanism 11 as well as an alternative stopper mechanism 7. The lifting and lowering mechanism 11 comprises an arm coupled between the supporting arms 4a, 4b or the pivoting beams 6a, 6b. The stopper mechanism 7, in turn, comprises a pair of articulated levers which are coupled between the frame 1 and the supporting beam 3 and whose pivoting movements are tied to each other. For example, one end or both ends of the lever are provided with a cogging which engages the corresponding cogging in the adjacent lever.

Figure 8A:
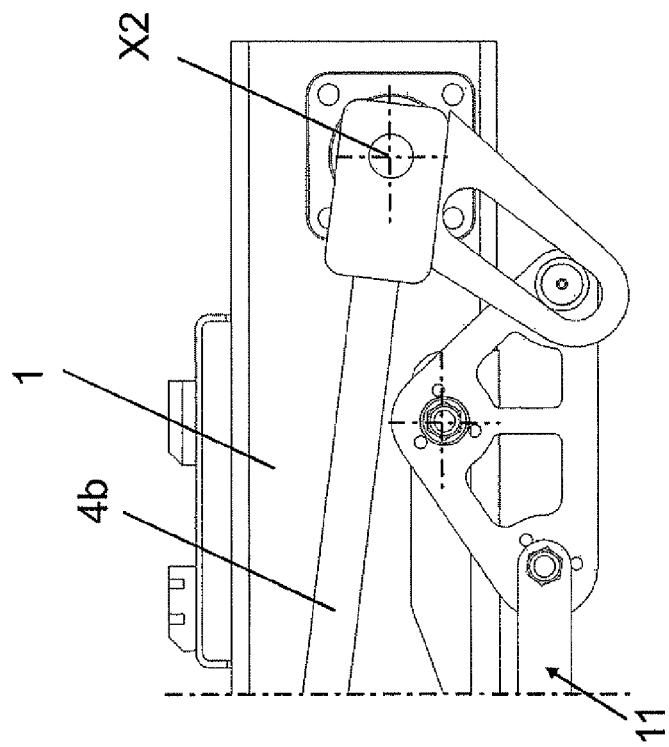
FIGS. 8a, 8b show the lifting and lowering mechanism according to another example of the station, seen from the side, as well as its movements.
Figure 8B:
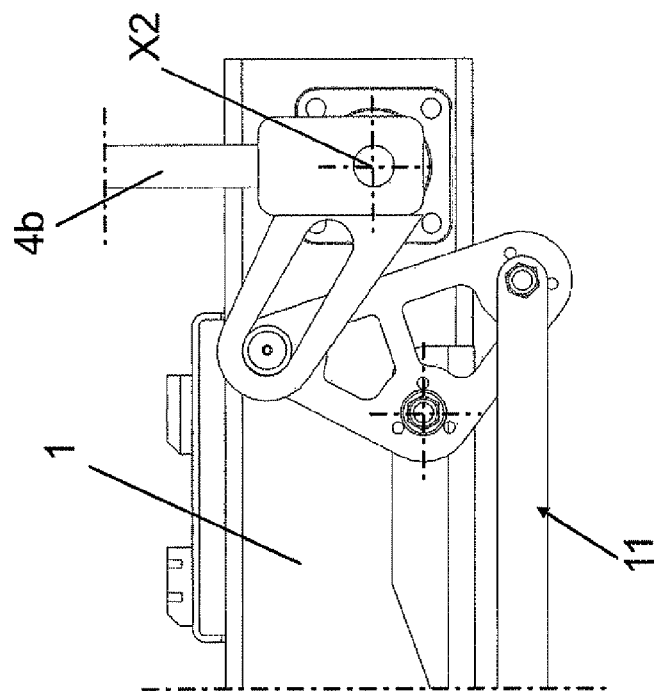

Also, FIGS. 8a, 8b show an alternative lifting and lowering mechanism 11 applying a pin movable in a slot. The slot, or alternatively the pin, is provided in the pivotable supporting arm 4b, and the pin, or alternatively the slot, is provided in the pivotable arm, to which also the push arm is coupled in an articulated manner, coupled in an articulated manner for example to a mechanism of a corresponding arm, slot and pin and coupled to the supporting arm 4a. Also in this example, the location of the pivot axes and the pivots, and particularly the positions of the slot and the pin with respect to each other, are fitted so that an external force effective on the vertical supporting arm 4b cannot tip over the supporting arm but generates a locking force or moment, or the forces are directed so that the supporting arm will not pivot.

The alternative lifting and lowering mechanisms as well as the alternative stopper mechanisms shown in the figures can be applied in various combinations. In the loading and unloading station, it is possible to employ at least one supporting beam, preferably two supporting beams, and most preferably several supporting beams, depending on the application and the more precise use of the station.

The invention is not limited solely to the examples presented in the drawings or in the description, but it can be applied within the scope of the appended claims.

The invention claimed is:
1. A loading and unloading station, comprising:
   a frame, on top of which a cassette for the carrying and storage of loads can be placed;
   at least two supporting arms pivotally connected to the frame such that the at least two supporting arms pivot around substantially horizontal pivot axes to a substantially horizontal position, in which the at least two supporting arms are placed under the cassette that is placed on the frame, and to a substantially vertical position, in which the at least two supporting arms extend through the cassette; and
   a supporting beam, on top of which a load can be placed and to which the at least two supporting arms are connected in a movable manner, wherein:
      the at least two supporting arms are fitted both to lift the supporting beam from below the cassette and through the cassette to above the cassette, and to lower the supporting beam back under the cassette; and
      the at least two supporting arms are further fitted to keep the supporting beam substantially in a horizontal position.
2. The loading and unloading station according to claim 1, wherein the loading and unloading station further comprises at least one lifting and lowering mechanism, under whose control the at least two supporting arms are fitted to pivot to different positions in a synchronized manner and simultaneously.

3. The loading and unloading station according to claim 1, wherein the loading and unloading station further comprises at least one stopper mechanism for limiting or totally preventing horizontal movement of the supporting beam.

4. The loading and unloading station according to claim 1, wherein the at least two supporting arms comprise two supporting arms which are fitted to pivot in opposite directions.

5. The loading and unloading station according to claim 1, wherein the pivot axes of the at least two supporting arms are parallel and substantially perpendicular to a vertical plane along which the supporting beam connected to the at least two supporting arms ascends and descends.

6. The loading and unloading station according to claim 1, wherein the loading and unloading station further comprises at least one beam which is coupled to the frame in a pivotable manner and to which is coupled at least one supporting arm of the at least two supporting arms, wherein said beam is also substantially parallel to said pivot axes.

7. The loading and unloading station according to claim 1, wherein the loading and unloading station comprises at least three adjacent supporting beams, and the horizontal distances between the at least three adjacent supporting beams with respect to each other are fitted to correspond to a forklift equipped with a fork in such a way that two horizontal lifting arms of the fork are placed between the at least three adjacent supporting beams.

8. The loading and unloading station according to claim 1, wherein the loading and unloading station comprises at least three adjacent supporting beams, and the height of the loading and unloading station and the distance of the loading and unloading station from a floor is fitted so that the fork of a forklift equipped with a fork and idlers can be pushed between the at least three adjacent supporting beams, above the cassette, and the idlers can be pushed under the loading and unloading station.

9. The loading and unloading station according to claim 2, wherein the at least one lifting and lowering mechanism is fitted to maintain the substantially vertical position of the at least two supporting arms connected to the at least one lifting and lowering mechanism in a situation in which the at least two supporting arms are subjected to an external force tending to pivot the at least two supporting arms.

10. The loading and unloading station according to claim 1, wherein said supporting beam comprises at least one guide fitted to yield in a reversible manner in a vertical direction and to limit the movement of a pallet placed on top of the supporting beam in a horizontal direction.

11. The loading and unloading station according to claim 1, wherein the cassette has a bottom with openings or slits.

12. The loading and unloading station according to claim 11, wherein the at least two supporting arms extend through the openings or the slits of the cassette in the substantially vertical position of the at least two supporting arms.

13. The loading and unloading station according to claim 11, wherein the pivot axes of the at least two supporting arms are substantially parallel and substantially perpendicular to a vertical plane along which the supporting beam connected to the at least two supporting arms ascends and descends.

14. The loading and unloading station according to claim 12, wherein the pivot axes of the at least two supporting arms are substantially parallel and substantially perpendicular to a vertical plane along which the supporting beam connected to the at least two supporting arms ascends and descends.

* * * * *